(12) United States Patent
Borovsky et al.

(10) Patent No.: US 8,769,424 B2
(45) Date of Patent: *Jul. 1, 2014

(54) SIMPLIFIED USER INTERFACE NAVIGATION IN AT LEAST FIRST AND SECOND CURSOR NAVIGATION DIRECTIONS

(75) Inventors: Andrew Borovsky, New York, NY (US); Matthew Millar, Oxfordshire (GB)

(73) Assignee: Adobe Systems Incorporated, San Jose, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/890,269

(22) Filed: Sep. 24, 2010

(65) Prior Publication Data

US 2011/0016391 A1 Jan. 20, 2011

Related U.S. Application Data

(63) Continuation of application No. 11/777,600, filed on Jul. 13, 2007, now Pat. No. 7,823,076.

(51) Int. Cl.
*G06F 3/00* (2006.01)
*G06F 9/00* (2006.01)
*G06F 17/00* (2006.01)

(52) U.S. Cl.
USPC ........... 715/763; 715/762; 715/764; 715/765; 715/838

(58) Field of Classification Search
USPC ......... 715/762, 763, 764, 765, 823, 835, 836, 715/837, 838, 864, 865, 866, 840
See application file for complete search history.

(56) References Cited

U.S. PATENT DOCUMENTS 5,677,708 A * 10/1997 Matthews et al. ....... 348/E5.104
6,151,426 A    11/2000 Lee et al.
(Continued)

FOREIGN PATENT DOCUMENTS

EP    978987 A2    2/2000

OTHER PUBLICATIONS

"Appendix G—Shortcuts for Windows 98" [online]. Microsoft Corporation, 1998 [retrieved on May 21, 2010]. Retrieved from the Internet: <URL: http://technet.microsoft.com/en-us/library/cc768168.aspx>.

(Continued)

*Primary Examiner* — Kieu Vu
*Assistant Examiner* — Anita D Chaudhuri
(74) *Attorney, Agent, or Firm* — Schwegman Lundberg & Woessner, P.A.

(57) ABSTRACT

Methods, systems, and apparatus, including computer program products, for user interface navigation. A method includes receiving first input indicating a first cursor navigation direction in a first visual area of a graphical user interface, the first visual area presenting one or more first content type indicators that are destinations for cursor navigation, selecting a next content type indicator based on the first cursor navigation direction and presenting a second visual area such that the next content type indicator is not visible but one or more other content type indicators are visible. The method includes presenting in the second visual area one or more content thumbnails that are destinations for cursor navigation in the second visual area, receiving second input indicating a second cursor navigation direction in the second visual area, and changing the second visual area to include a next content thumbnail based on the second cursor navigation direction.

17 Claims, 9 Drawing Sheets

(56) References Cited

U.S. PATENT DOCUMENTS

| | | | |
|---|---|---|---|
| 6,961,731 B2 * | 11/2005 | Holbrook | 1/1 |
| 6,961,908 B2 | 11/2005 | Phillips | |
| 7,166,791 B2 | 1/2007 | Robbin et al. | |
| 7,296,242 B2 * | 11/2007 | Agata et al. | 715/793 |
| 7,312,785 B2 | 12/2007 | Tsuk et al. | |
| 7,539,795 B2 | 5/2009 | Vahtola | |
| 2003/0160814 A1 | 8/2003 | Brown | |
| 2004/0205504 A1 | 10/2004 | Phillips | |
| 2005/0210399 A1 | 9/2005 | Filner et al. | |
| 2005/0246651 A1 * | 11/2005 | Krzanowski | 715/770 |
| 2006/0136816 A1 | 6/2006 | Jones et al. | |
| 2006/0206807 A1 | 9/2006 | Rosner et al. | |
| 2007/0011146 A1 * | 1/2007 | Holbrook | 707/3 |
| 2007/0016557 A1 * | 1/2007 | Moore et al. | 707/3 |
| 2007/0083911 A1 | 4/2007 | Madden et al. | |
| 2007/0189737 A1 | 8/2007 | Chaudhuri et al. | |
| 2007/0271532 A1 * | 11/2007 | Nguyen et al. | 715/854 |

OTHER PUBLICATIONS iRiver U10 Getting Started User's Guide [online], [retrieved on Jan. 18, 2008], 45 pages. Retrieved from Internet, URL: http://www.iriveramerica.com/download/u10/U10_ENG_MTP.pdf.

Xbox 360: System Use—How to use the Xbox Dashboard [online], [retrieved on Jan. 18, 2008], 2 pages. Retrieved from Internet, URL: http://www.xbox.com/en-US/support/systemuse/xbox360/console/dashboard.htm.

Wikipedia "Cursor (Computers)", dated Dec. 15, 2005, downloaded from the internet at http://web.archive.org/web/20051215000000/http://en.wikipedia.org/wiki/Cursor_(computers) on Aug. 12, 2011, 1 page.

Wikipedia "GUI", dated Jun. 5, 2006, downloaded from the internet at http://web.archive.org/web/20060613041006/http://en.wikipedia.org/wiki/GUI on Aug. 12, 2011, 3 pages.

* cited by examiner

SIMPLIFIED USER INTERFACE NAVIGATION IN AT LEAST FIRST AND SECOND CURSOR NAVIGATION DIRECTIONS

CROSS-REFERENCE TO RELATED APPLICATIONS

This application is a continuation (and claims the benefit of priority under 35 USC 120) of U.S. application Ser. No. 11/777,600, filed Jul. 13, 2007. The disclosure of the prior application is incorporated herein by reference in its entirety.

BACKGROUND

Navigation of hierarchical menus on small displays such as those found on mobile devices (e.g., mobile phones, smart phones, personal digital assistants, etc.) can be confusing, requiring a user to fully commit into a menu before they are certain that is what they want to do. Conventional navigation methods traverse a variety of menus in a graphical user interface (GUI) without preserving contextual information for the user—e.g. once within a menu item, there is no visual cue for the user to suggest how they got to the menu or what comes before it, after it, or how to get back to where they started from. After one of a series of displayed menu choices is selected, the choices disappear when the display is advanced into the menu choice. Moreover, navigation on a mobile phone is typically one-way, i.e. once a series of navigational inputs is performed, the reverse of the same series of inputs would not return the display to its original state.

SUMMARY

In general, one aspect of the subject matter described in this specification can be embodied in a method that includes receiving first input from an input control, the first input indicating a first navigation direction in a first visual area of the GUI, the first visual area presenting one or more first content type indicators, each first content type indicator representing a distinct content type. In response to the first input, a next content type indicator is selected from the first content type indicators based on the navigation direction. A second visual area is presented over the first visual area such that the next content type indicator is not visible but one or more other content type indicators are visible. One or more content thumbnails are presented in the second visual area, each thumbnail being a representation of distinct content of the next content type indicator's content type. Second input is received from the input control, the second input indicating a distinct second navigation direction in the second visual area. And in response to the second input, the second visual area is changed to include a next content thumbnail from the content thumbnails based on the second navigation direction. Other implementations of this aspect include corresponding systems, apparatus, and computer program products.

These and other implementations can optionally include one or more of the following features. The second visual area is moved relative to the first visual area in response to the first input. The first visual area is changed to include the next content type indicator in response to the first input. Updating the second visual area can include animating movement of content thumbnails in the second visual area in response to one or more of the first input or the second input. The appearance of the first visual area is diminished relative to the second visual area. A thumbnail is a condensed visual representation of content. A content type is one of electronic mail, news, weather, stock information, music, image, video, voice mail, calendar information, or contact. Data for content is obtained from a network location. A content type indicator hint is presented in the first visual area, the hint being a visual representation of the next content type indicator. Each content type is associated with a distinct application, further comprising obtaining a thumbnail for each content having the next content indicator's content type from a respective application for the content type.

Particular implementations of the subject matter described in this specification can be implemented to realize one or more of the following advantages. A GUI for a mobile device or other device is provided. The GUI can be navigated using input devices such as a five-way input joystick or other input devices. Users can interact with menus in reversible manner, e.g., users can navigate through various hierarchies and get back to where they started from by reversing the order of their navigational input. Once one of a series of displayed menu choices is selected, the selected menu choice expands inline with the series of choices thereby preserving context for the user. When scrolling left/right between content of the same content type (e.g. weather forecasts for different cities), the current content slides/animates visually to make room for the next content. When viewing a set of contents, there is an indication of which content is being displayed and how many total contents there are. As a user navigates up/down through content type indicators, the content type indicator list expands in-line, so that the currently selected content type takes up a large portion of the screen, but is nonetheless still visually presented in the same order of the various sets of content type indicators. A content indicator hint can be displayed which shows the user that there is additional content and also shows the user the user how to move forward or backward through content. This allows the user to maintain context amongst the various menus at all times.

The details of one or more implementations of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
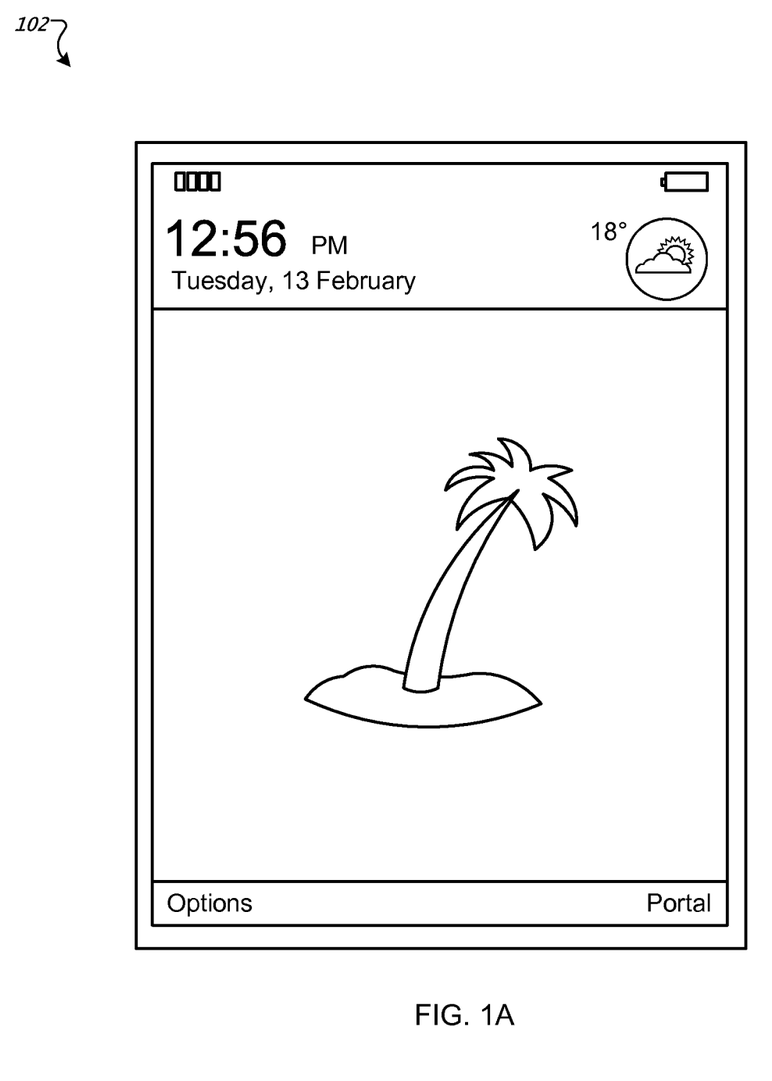
FIG. 1A illustrates an example home screen for a mobile device.

FIG. 1A illustrates an example home screen for a mobile device. The mobile device can be a mobile phone, smart phone, personal digital assistant (PDA), Blackberry device, laptop computer, Pocket PC, electronic gaming device, media player, or combinations of these. The mobile device includes a display 102. The display 102 presents a graphical user interface (GUI) for applications which run on the mobile device. For example, applications such as a phone book, a calendar, news reader, photo manager and music applications can display text, audio, image, video and other types of content on the display 102.

Typically, the display 102 is small and can include a limited area in which to display information. A user of the mobile device typically wants to be able to quickly navigate to and interact with content. In various implementations, users can navigate to and select content by providing navigational input through an input control. An input control can be a joystick, such as a 5-way joystick, a trackball, one or more buttons, one or more dials or knobs, a motion detector for detecting the motion and/or orientation of the mobile device, a speech recognition unit for recognizing speech commands, and the display 102 itself, for example. In the case of a display input control, a user can provide navigational input by touching the display 102 with one or more fingers or a stylus.

Figure 1B:
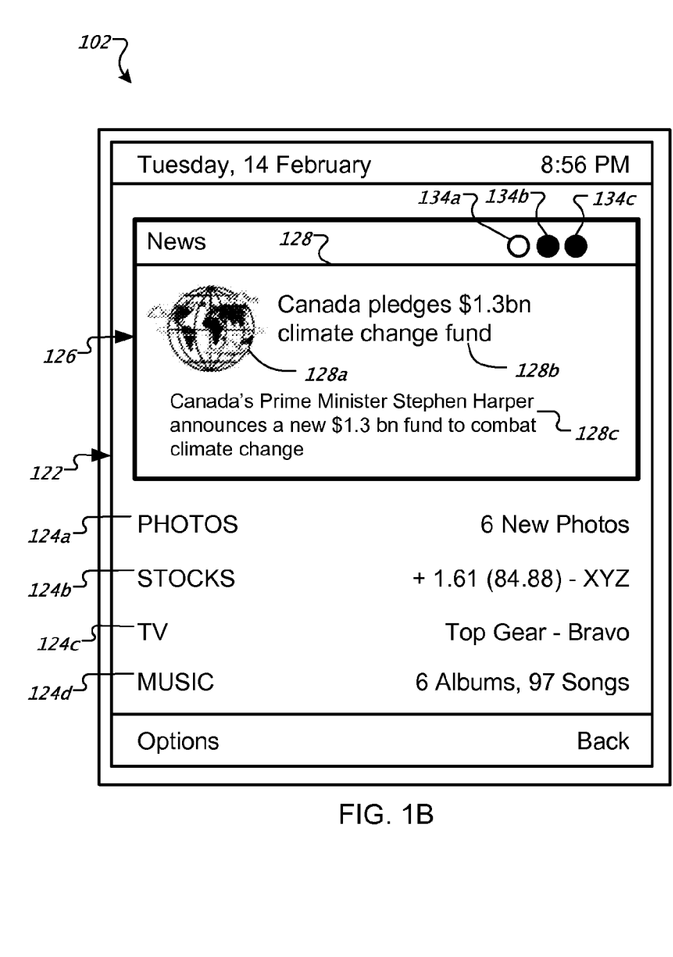
FIG. 1B illustrates an example content type indicator window.

FIG. 1B illustrates an example content type indicator window 122. A content type indicates a set of content sharing one or more attributes in common or content that does not share any attributes in common. For example, content types can be electronic mail, news reports, weather forecasts, stock prices, music, images, videos, voice mail, calendar information, or contacts, to name a few examples. Content can be stored locally on the mobile device (e.g. on a local disc or in local flash memory). Content can also be accessed over a network. For example, content can be streamed from a network source. In some implementations, content can be retrieved using the Adobe® FlashCast™ system, available from Adobe Systems Incorporated of San Jose, Calif.

The first time a user or a process provides navigational input (e.g., interacts with an input joystick), a set of content type indicators can be presented in the content type indicator window 122, as shown in FIG. 1B. For example, a user can press a down arrow key on a keypad. As another example, a user can move a joystick in a particular direction, such as up, down, left, right, or diagonal.

Content type indicators indicate a distinct content type, and can serve as a navigational aid for a user. The content type indicator window 122 can have one or more content type indicators. The content type window 122 here includes content type indicators 124a-d, which indicate content types of photos, stocks, TV, and music, respectively.

The content type indicators 124a-d can be text, as shown in FIG. 1B, or they can be icons or some other representation of content. The content type indicators 124a-d can be displayed in a vertical list, as shown in FIG. 1B, or they can be displayed in other spatial arrangements, such as in a horizontal list, rectangular grid, or in some other two or three-dimensional arrangement. The content type indicator window 122 can include more content type indicators that can fit on the display at a given time. For example, the content type indicator window 122 can include horizontal and vertical scrolling controls (e.g. scroll bars) to allow navigation to content type indicators that are not currently visible.

In response to the selection of a content type indicator, a content window 126 can be presented over or within the content type indicator window 122. In various implementations, selection of a content type indicator or content automatically happens as a result of navigational input. In other implementations, selection requires additional input beyond navigational input. The selection of a content type indicator indicating news content can result in the presenting of the content window 126 over the content type indicator window 122. The content window 126 can display one or more content thumbnails. A content thumbnail is a representation of content having the content type of the selected content type indicator, such as a condensed view of content, for example. Other thumbnail representations are possible. A content thumbnail can be text-only, a graphic, a combination of text and graphics, or some other combination. For example, a content thumbnail 128 in the content window 126 includes a picture 128a, a news story headline 128b, and a partial news story 128c. The content type indicator window 122 can be displayed in a diminished appearance (e.g. dimmed or grayed out) as compared to the content window 126.

In response to a navigational input (e.g., a key press), a next content type indicator in the content type indicator window 122 can be selected, based on a direction implied by the input. For example, the content type indicator 124a indicating photograph content, which in FIG. 1B is shown underneath the content window 126, can be selected in response to the press of a down arrow key.

Figure 1C:
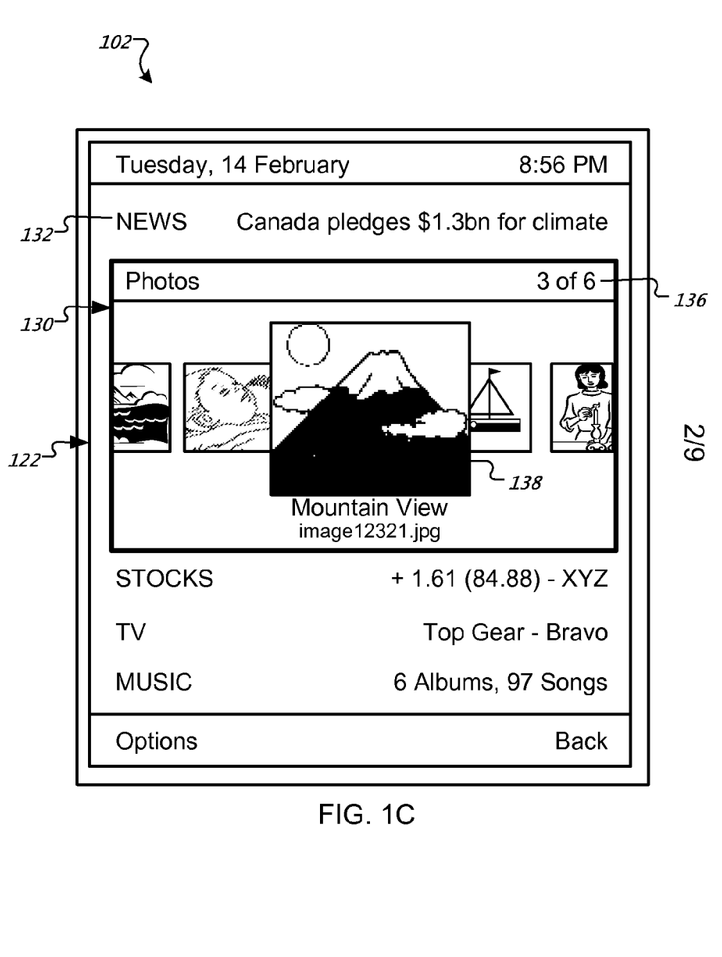
FIG. 1C illustrates example animation of a content window.

FIG. 1C illustrates an example animation of a content window. In response to the selection of a next content type indicator, a content window 130 can be displayed for the selected content type. For example, in response to the selection of the content type indicator 124a, a content window 130 can be presented over the content type indicator window 122, as shown in FIG. 1C. The content window for a previously selected content type can be hidden (e.g., there is no content window associated with news 132 in FIG. 1C). The content window can appear to move in response to user input. For example, the display of the content window 130 and the hiding of the content window 126 can appear to the user as if the content window 126 has moved downward in the content type indicator window 122.

A content type indicator for a previously selected content type can be made visible after the selection of a new content type indicator. For example, the content type indicator 132 indicating news content (FIG. 1C) can be made visible in response to the selection of the content type indicator 124a indicating photograph content (FIG. 1B). The selection of a content type indicator can result in an implicit deselection of the previously selected content type indicator.

A content window can completely cover an associated content type indicator resulting in the hiding of the content type indicator when the associated content window is shown. For example, the news content window 126 completely covers the news content type indicator 132 (i.e., the news content type indicator 132 is not visible in FIG. 1B when the news content window 126 is displayed. However, the news content type indicator 132 is visible in FIG. 1C when a different content window (e.g., content window 130) is displayed after the selection of a different content type indicator. As another example, the content type indicator 124a of FIG. 1B is not visible in FIG. 1C when the associated content window 130 is displayed.

A content window can optionally have a title which can be the same name as the associated content type indicator. For example, the content window 126 includes a title with the text "News", and the content window 130 includes a title with the text "Photos". Mobile devices typically do not have a large enough display size to show multiple levels of context on the screen at the same time. Having a content window with title text the same as the text of the content type indicator can help communicate navigational context to the user.

A user can navigate to different content thumbnails in a content window. For example, in FIG. 1B, the user can navigate to different news story thumbnails in the content window 126. In FIG. 1C, a user can navigate to different photograph thumbnails in the content window 130. In some implementations, navigational input for navigating content thumbnails is distinct from navigational input for navigating through content type indicators. For example, in one implementation, a user can navigate through content type indicators using up and down arrow keys and can navigate through content thumbnails using left and right arrow keys. In another implementation, the user can use the same navigational input directions to move through either content type indicators or content thumbnails (e.g., up and down arrow keys can be used to navigate through either content type indicators or content thumbnails). In such an implementation, a user can provide another input (e.g., press a modifier key) to indicate which set of items they wish to navigate through.

A content window can include one or more visual indicators which can indicate how many content thumbnails of a particular content type are available. For example, the content window 126 includes a set of circles 134a-c which indicate that three news items are available. The open circle 134a indicates that the user is viewing the first of the three items. As another example, the content window 130 includes a "3 of 6" text label 136 that indicates that a selected content thumbnail 138 is the third in a set of six photograph thumbnails.

A content window can display one or more content thumbnails at a time. For example, the content window 126 shows one news story thumbnail at a time. In contrast, the content window 130 displays several photograph thumbnails. In some implementations, the thumbnail 138 is shown in a size larger than the other thumbnails in the content window 130, to indicate to the user that it is the selected content thumbnail. The selected content thumbnail 138 includes a text description of the picture and a filename associated with the picture. Content thumbnails can be shown in a horizontal, linear arrangement, as shown in the content window 130, or they can be arranged in other two or three-dimensional configurations. For example, content thumbnails can be arranged in a vertical list or in a rectangular grid.

A user can initiate an input to open a selected content thumbnail in an application or viewer program. For example, a user can open the content thumbnail 138 in a photo manager application to view and interact with the photograph. As another example, the user can open the content thumbnail 128 in a news reader program to read the full text of the associated news story.

Figure 1D:
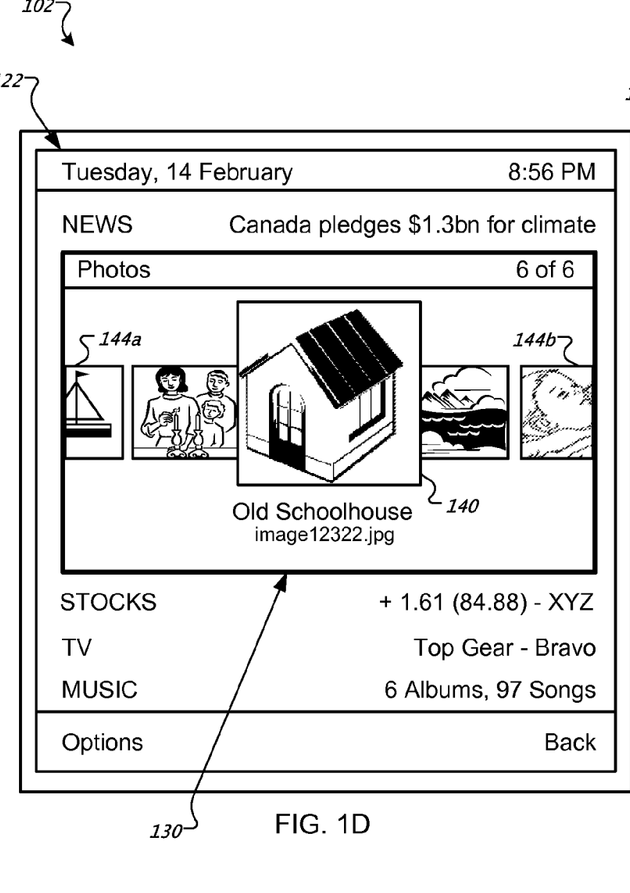
FIGS. 1D-E illustrate example navigation of content thumbnails.
Figure 1E:
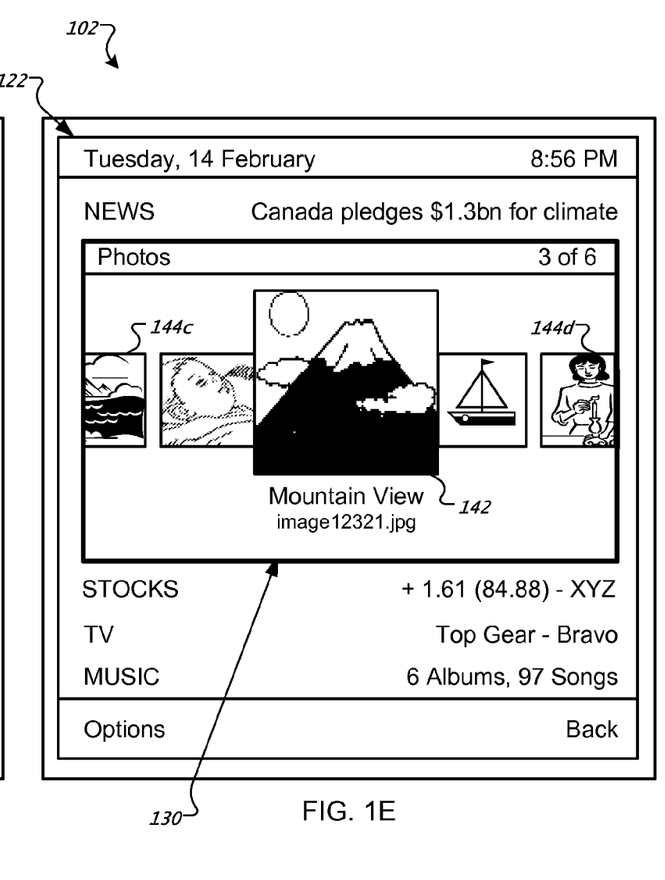

FIGS. 1D-1E illustrate example navigation of content thumbnails. A content window, such as content window 130, can include more content thumbnails that can simultaneously be displayed in the content window 130. A content window can provide an ability for the user to scroll to content thumbnails that are not currently visible. A user can scroll, for example, by using an input control, such as a scroll bar, or by pressing a navigational key. For example, in some implementations, a user viewing a selected content thumbnail 140, as displayed in FIG. 1D, can press a right arrow key three times to select a content thumbnail 142, as illustrated in FIG. 1E. The content thumbnail 142 is not visible in FIG. 1D but becomes visible in FIG. 1E as the user scrolls to the right.

The content thumbnails can "wrap around" as the user scrolls. For example, the "sixth" content thumbnail 140 (i.e., "6 of 6") is selected in FIG. 1D, and as the user scrolls three times to the right to select the "third" content thumbnail 142 (i.e., "3 of 6", as illustrated in FIG. 1E), the "index" or "number" of the selected content thumbnail "wraps around" from 6 to 1 (and then is incremented from 1 to 2, and then from 2 to 3 as the user continues to scroll). Content thumbnails on the edges of the content window 130, such as content thumbnails 144a-d, can appear cropped, to indicate that more content thumbnails can be viewed by scrolling to and beyond the edges.

Figure 1F:
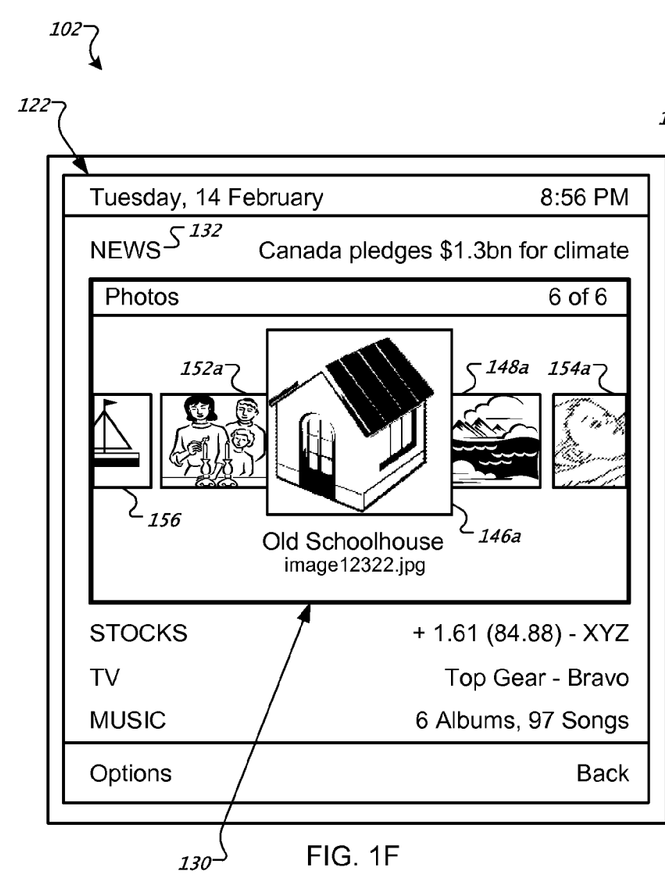
FIGS. 1F-G illustrate example animation of content thumbnails.
Figure 1G:
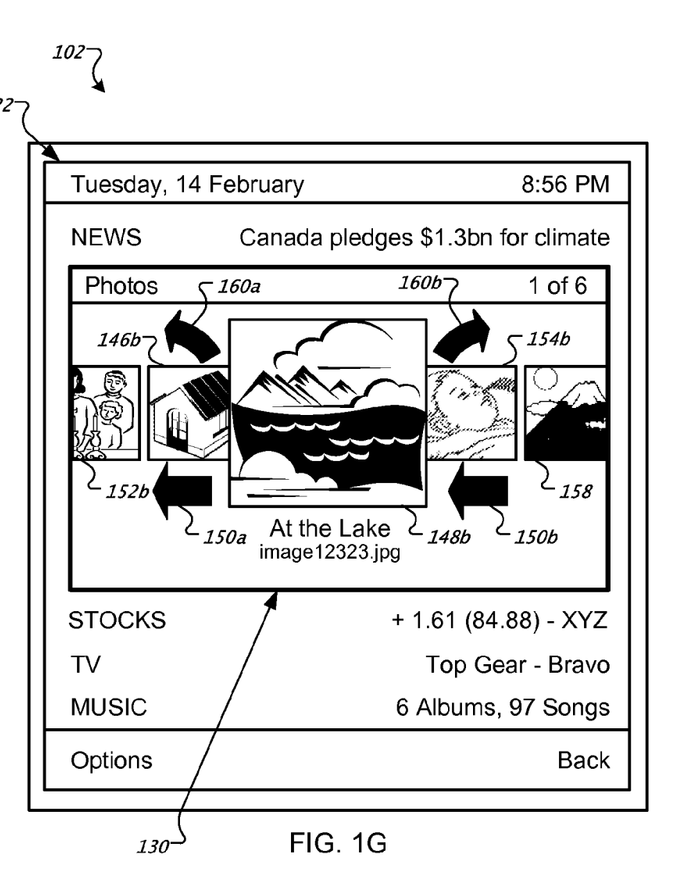

FIGS. 1F-1G illustrate example animation of content thumbnails. As a user scrolls through content thumbnails, content thumbnails can animate and move in response to the scrolling. For example, in a pre-navigation view shown in FIG. 1F, a schoolhouse image content thumbnail 146a is selected. If the user navigates in the content window 130 to the right (e.g., by pressing a right arrow key), a lake image content thumbnail 148b can be selected, as illustrated in the post-navigation view shown in FIG. 1G. A number of content thumbnails can move in response to the selection of the new content thumbnail. For example, all content thumbnails can move to the left (as indicated by arrows 150a-b) in response to the rightward navigation illustrated in the FIG. 1F to FIG. 1G transition. For example, content thumbnails 152a and 154a shown in FIG. 1F move leftward, as illustrated by associated content thumbnails 152b and 154b shown in FIG. 1G.

A number of other changes can occur to content thumbnails in response to a navigation, such as clipping, hiding and showing. For example, the right side of the content thumbnail 152a appears clipped (i.e., the right side of content thumbnail 152a is hidden behind the selected content thumbnail 146a) in FIG. 1F, but the corresponding content thumbnail 152b in FIG. 1G does not have its right side clipped. However, the left side of the content thumbnail 152b is clipped in FIG. 1G, but the left side of the associated content thumbnail 152a is not clipped in FIG. 1F. Other differences in clipping exist between content thumbnails 146a, 148a, and 154a and the corresponding associated content thumbnails 146b, 148b, and 154b. A leftmost content thumbnail 156 shown in FIG. 1F disappears from the content window 130 in response to the selection of content thumbnail 148b (i.e., content thumbnail 156 does not appear in the post-navigation view shown in FIG. 1G). A rightmost content thumbnail 158 in FIG. 1G does not appear in FIG. 1F. The content window 130 can include more content thumbnails than can be displayed at one time, and in response to a navigation, previously invisible content thumbnails can be displayed.

Some content thumbnails can change size in response to the selection of a new content thumbnail, to indicate the change in selection. For example, the selected schoolhouse image content thumbnail 146a is shown in FIG. 1F in an enlarged size, to indicate it is the currently-selected thumbnail, and after the user navigates to the right, the schoolhouse image is shown in a smaller-sized content thumbnail 146b in FIG. 1G, to indicate it is no longer the selected thumbnail. As another example, a lake image content thumbnail 148a is shown in a size smaller than the size of the selected content thumbnail 146a in FIG. 1F, to indicate it is not the currently-selected thumbnail, but the lake image content thumbnail 148b is shown in a larger size in FIG. 1G to indicate that it is now the selected thumbnail. Content thumbnails 146b and 148b have also moved leftward (as compared to the positions of associated content thumbnails 146a and 148a) in response to the rightward navigation.

In response to the enlarging of the newly selected content thumbnail (e.g., the enlarging of the selected lake image content thumbnail 148b as compared to the unselected content thumbnail 148a), content thumbnails to the immediate left and immediate right of the selected thumbnail can "move apart" to make room for the selected content thumbnail. For example, content thumbnails 146b and 154b can move as indicated by arrows 160a-b.

Figure 1H:
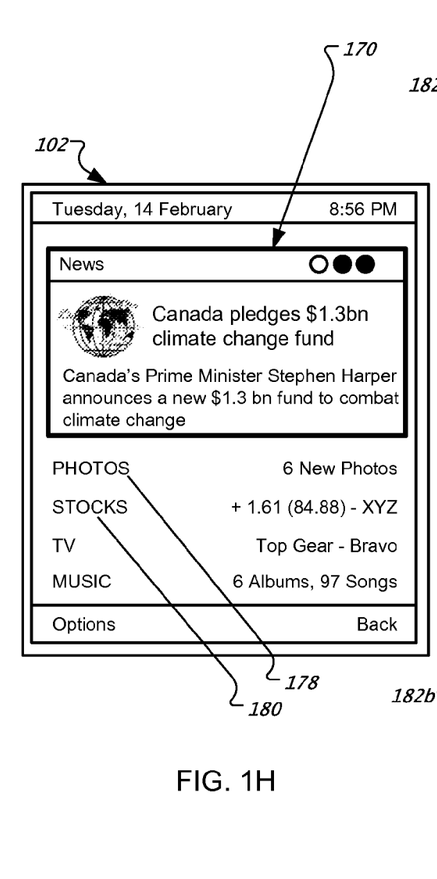
FIGS. 1H-J illustrate example animation of content type indicators.
Figure 1I:
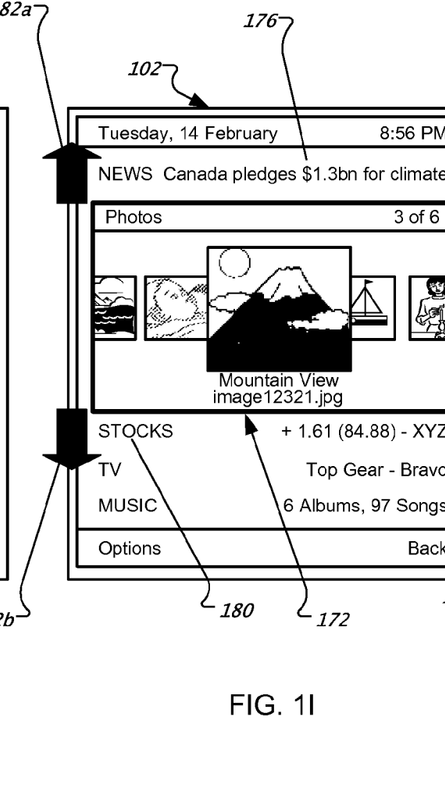
Figure 1J:
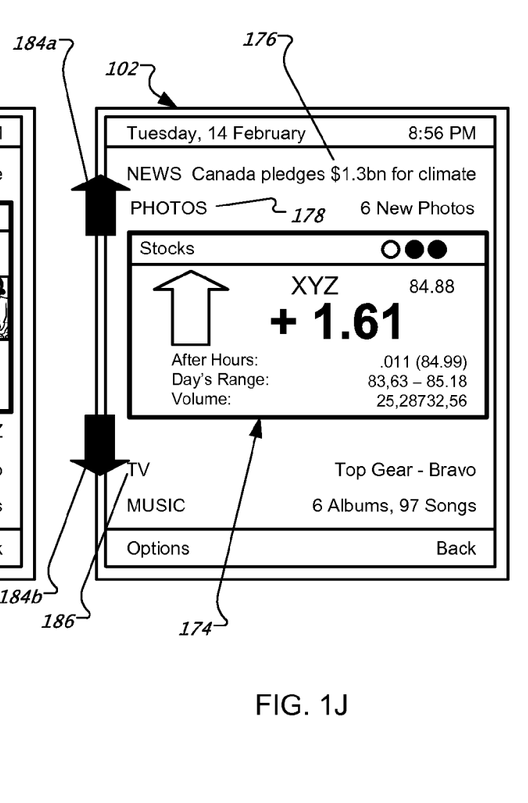

FIGS. 1H-1J illustrate animation of content type indicators. Each of the FIGS. 1H-1J shows the selection of a different content type. The transitions from FIG. 1H to FIG. 1I and from FIG. 1I to FIG. 1J illustrate the selection and animation of content type indicators and content windows as a user navigates through a list of content type indicators. FIG. 1H shows a news content window 170, FIG. 1I shows a photograph content window 172, and FIG. 1J shows a stocks content window 174. The news content window 170 can be displayed in response to the selection of a news content type indicator 176, the photograph content window 172 can be displayed in response to the selection of a photos content type indicator 178, and the stocks content window 174 can be displayed in response to the selection of a stocks content type indicator 180.

In FIG. 1H, the news content window 170 is active. If the user navigates to the photos content type indicator 178 (e.g., by pressing a down arrow key), the photograph content window 172 can be displayed, as illustrated in FIG. 1I. The photos content type indicator 178 can be hidden while the photos content window 172 is displayed. In FIG. 1I, to indicate that the news content window 170 is no longer active, the news content window 170 can be hidden and the news content type indicator 176 can be shown (i.e., as shown in FIG. 1H, the news content type indicator 176 is not visible if the news content window 170 is active, but, as illustrated in FIG. 1I, the news content type indicator 176 is displayed if the news content window 170 is not displayed). If the user navigates downward and selects the stocks content type indicator 180, the stocks content window 174 can be displayed, as illustrated in FIG. 1J. The photos content window 172 can be hidden, and the photos content type indicator 178 can be displayed.

As the user navigates through content type indicators, the content window can appear to move, or "slide", in the direction that the user navigates. For example, as the user moves downward, as illustrated in FIGS. 1H-1J, the content window 170 is replaced with the content window 172, the content window 172 is replaced with the content window 174, and the displayed content window appears lower on the display 102 each time a downward navigation occurs.

Content type indicators can appear to "move apart" to make room for the newly displayed content window. For example, as illustrated by arrows 182a-b in FIG. 1I, the news content type indicator 176 can appear to be "pushed up" and the stocks content type indicator 180 can appear to be "pushed down" to make room for the replacement of the photos content type indicator 178 with the photos content window 172. Similarly, as illustrated by arrows 184a-b in FIG. 1J, the photos content type indicator 178 can appear to be "pushed up" and a TV content type indicator 186 can appear to be "pushed down" to make room for the replacement of the stocks content type indicator 180 with the stocks content window 174.

Figure 1K:
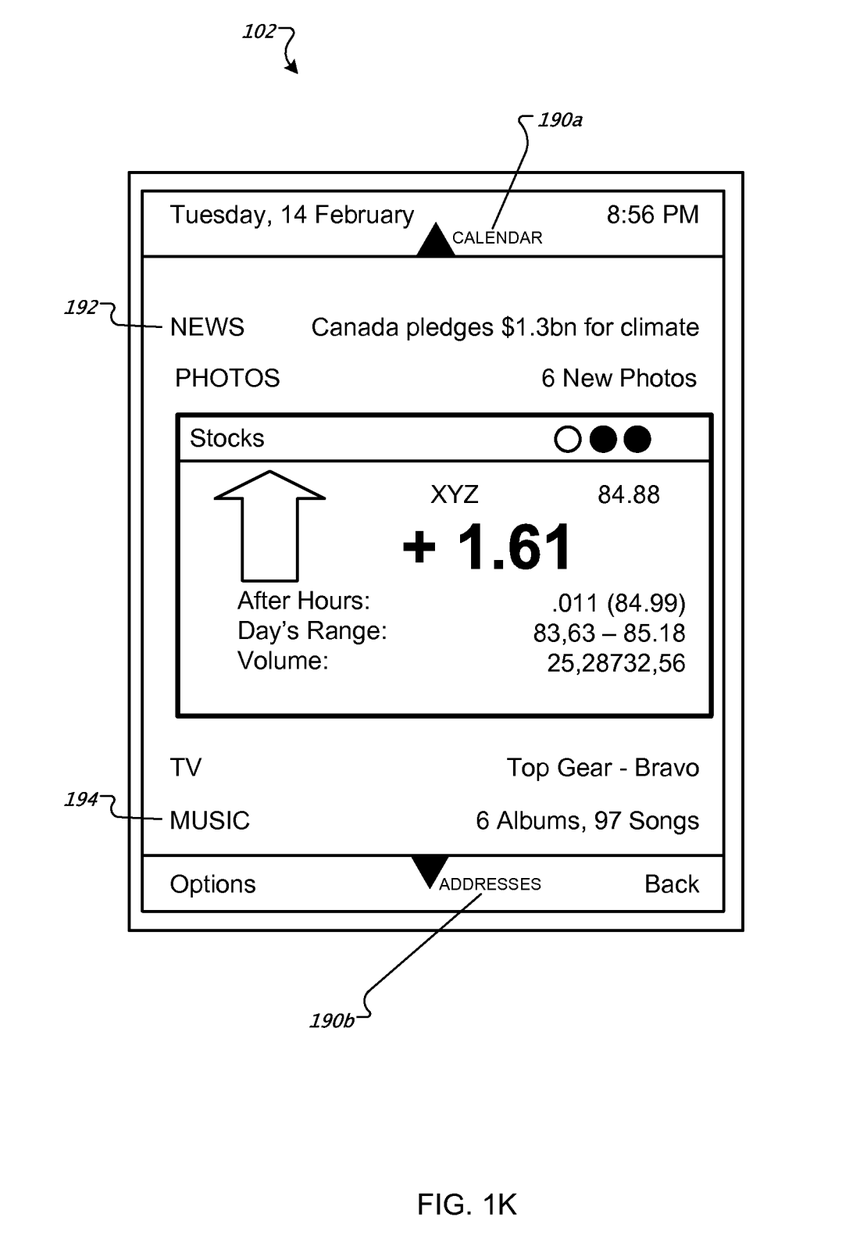
FIG. 1K illustrates an example content indicator hint.

FIG. 1K illustrates example content indicator hints 190a-b. Content indicator hints 190a-b can appear at the edges of a set of content type indicators (e.g., at the top or bottom of a vertical list of content type indicators displayed in a content type indicator window, as shown in FIG. 1K). Content indicator hints 190a-b can provide hints to a user that there are more content type indicators (i.e., more selectable content) in the directions indicated by the content indicator hints. For example, the content indicator hint 190a indicates that there is more content above the content type indicator 192. Similarly, the content indicator hint 190b indicates that there is more content below the content type indicator 194. A user can scroll to see content indicated by a content indicator hint. For example, in some implementations, a user can scroll upward by pressing an up arrow key to view content indicated by content indicator hint 190a. Similarly, in some implementations, a user can scroll downward by pressing a down arrow key to view content indicated by content indicator hint 190b.

Content indicator hints can include a text label which can indicate a type of content that can be scrolled to. For example, the content indicator hint 190a indicates that content related to calendars is above content type indicator 192. Similarly, content indicator hint 190b indicates that content related to addresses is below content type indicator 194. A content indicator hint can include text in a font smaller than text used for content type indicators. A content indicator hint can include a symbol to represent direction, such as the arrow symbols shown in content indicator hints 190a-b. A content indicator hint can include a graphic symbol which represents the content that can be scrolled to (e.g., content indicator hint 190a can include a small image of a calendar, and content indicator hint 190b can include a small image of an address card).

Figure 2:
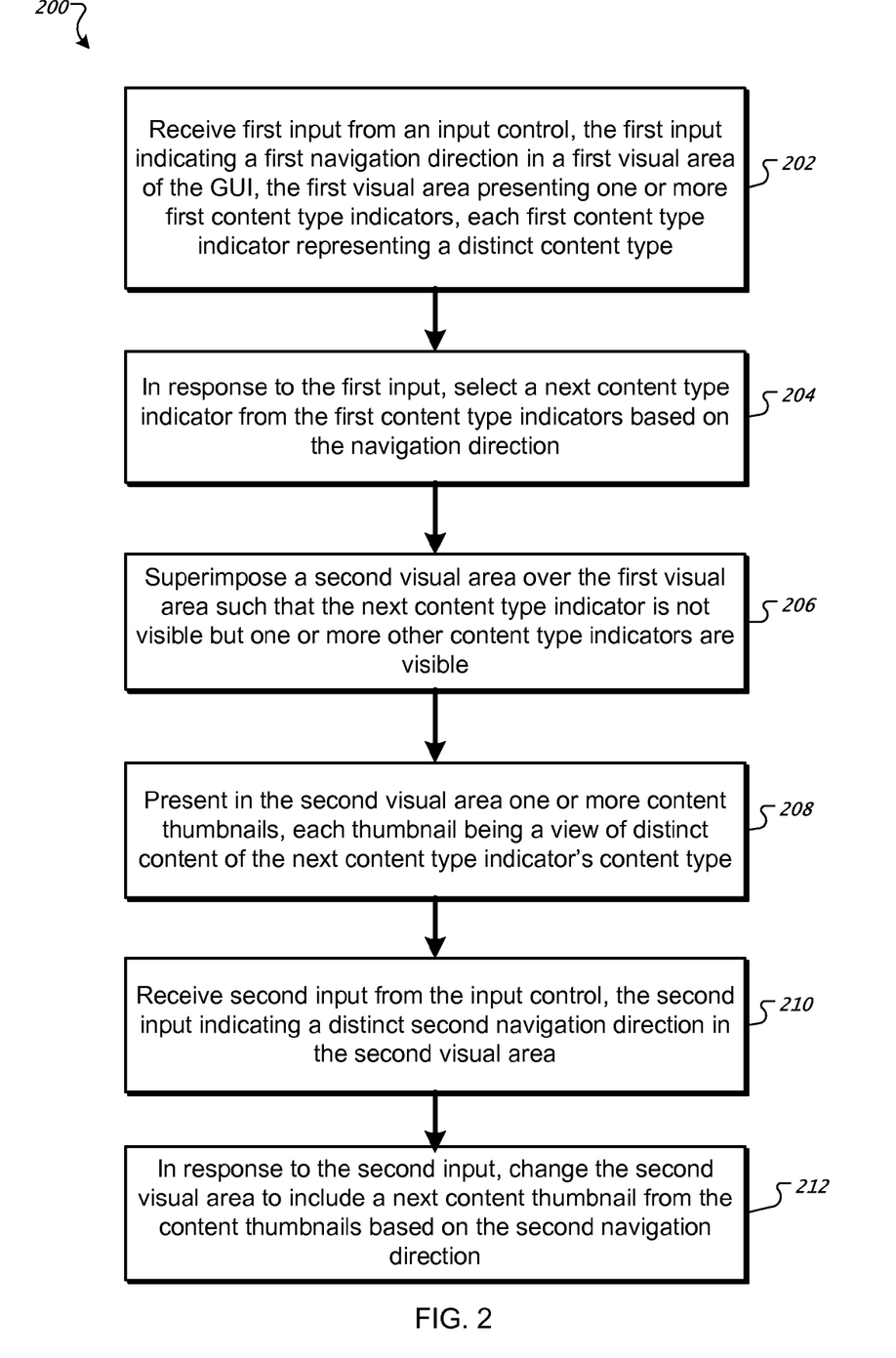
FIG. 2 is a flowchart of a method for navigation through content type indicators and content thumbnails.

FIG. 2 is a flowchart of a method for navigation through content type indicators and content thumbnails. First, a first input indicating a first navigation direction in a first visual area of the GUI is received (step 202), where the first visual area presents one or more first content type indicators and each first content type indicator represents a distinct content type. For example, a user can indicate a downward direction (e.g., by pressing a down key) in the content type indicator window 122 (FIG. 1B), where the content type indicator window 122 includes content type indicators 124a-d, and each content type indicator 124a-d represents a different content type (e.g., photos, stocks, television, music).

Next, in response to the first input, a next content type indicator from the first content type indicators is selected, based on the navigation direction (step 204). For example, the photos content type indicator 124a, located underneath the selected content window 126, can be selected (FIG. 1B) in response to a downward navigation.

A second visual area is then presented over the first visual area such that the next content type indicator is not visible but one or more other content type indicators are visible (step 206). For example, the photos content window 130 can be displayed over the content type indicator window 122 (FIG. 1F), the photos content type indicator 124a can be made invisible, and the news content type indicator 132 (i.e., the content type indicator of the previously-selected content type) can be made visible.

One or more content thumbnails are then presented in the second visual area, each thumbnail being a view of distinct content of the next content type indicator's content type (step 208). For example, photograph content thumbnails 146a, 148a, 152a, 154a, and 156 can be displayed in the content window 130 (FIG. 1F).

A second input is then received from the input control, the second input indicating a distinct second navigation direction in the second visual area (step 210). For example, the user can indicate a rightward horizontal navigation direction in the content window 130 by pressing a right arrow key.

Next, in response to the second input, the second visual area is changed to include a next content thumbnail from the content thumbnails based on the second navigation direction (step 212). For example, the content window 130 can be changed to show an enlarged content thumbnail 148b and a new content thumbnail 158 (FIG. 1G).

Figure 3:
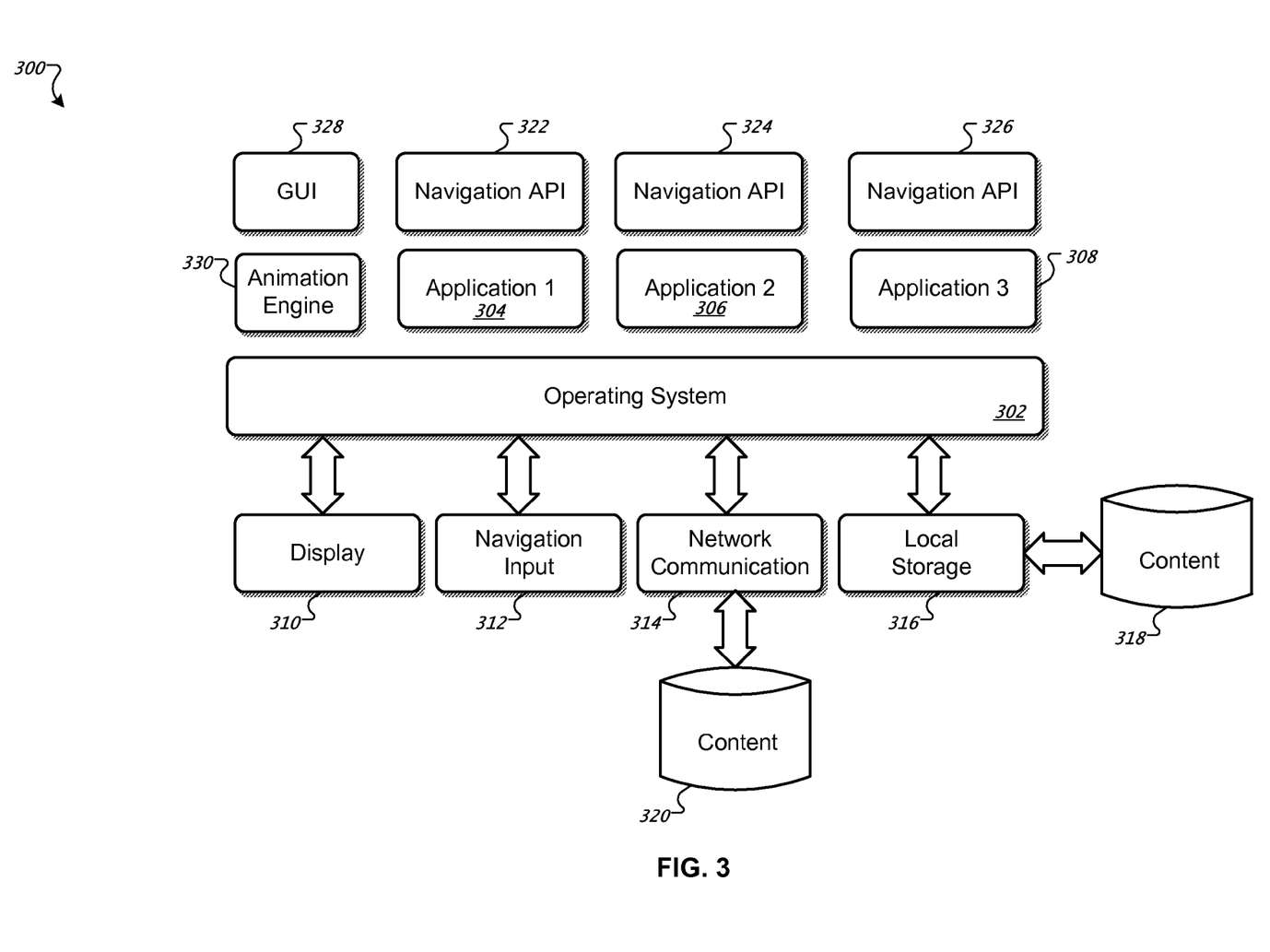
FIG. 3 is an example system diagram for content type indicator and content thumbnail navigation.

FIG. 3 is a system diagram for content type indicator and content thumbnail navigation. A mobile device operating system (OS) 302 provides a layer between applications, such as applications 304, 306 and 308, and a mobile device's hardware components. The hardware components include, for instance, a display 310, user input devices 312 (e.g., keypad, mouse, touch screen, microphone), network communication devices 314 for communicating through wired or wireless networks (e.g., cellular, satellite, IEEE 802.11 based networks, other suitable networks, and combinations of these), and local storage 316 (e.g. a local disc or local flash memory). Application content 318 can be stored and retrieved from local storage 316 and/or content 320 can be received from a network connection. In some implementations, content can be retrieved using the Adobe® FlashCast™ system, available from Adobe Systems Incorporated of San Jose, Calif. Examples of suitable mobile device OS's are Symbian OS (available from Symbian, Inc.), Binary Runtime Environment for Wireless or "BREW" (available from Qualcomm Incorporated), and Windows Mobile (available from Microsoft Corporation). However, other OS's can also be used.

Mobile device applications 304, 306 and 308, for example, address book manager, photograph manager, and music player applications, can expose navigation application programming interfaces (API) 322, 324 and 326. Each of the applications 304, 306 and 308 can process a particular content type. For example, a photo manager application can process photographic content, a news reader program can process news content, etc. The navigation APIs 322, 324 and 326 allow a graphical user interface (GUI) 328 to invoke the applications 322, 324 and 326 to present content. For example, content thumbnails can be displayed when a content window (e.g., content window 172) is displayed in response to the selection of a content type indicator. In addition, the user can launch an application 304, 306 and 308 when a content thumbnail (e.g., content thumbnail 146a) is selected. The APIs 322, 324 and 326 can provide standard functions, which can be invoked by the GUI 328, which can indicate the content types that a particular application supports. Other functions can be provided to render content thumbnails for content items. The GUI 328 can use an animation engine 330 to animate content type indicators and content thumbnails.

Figure 4:
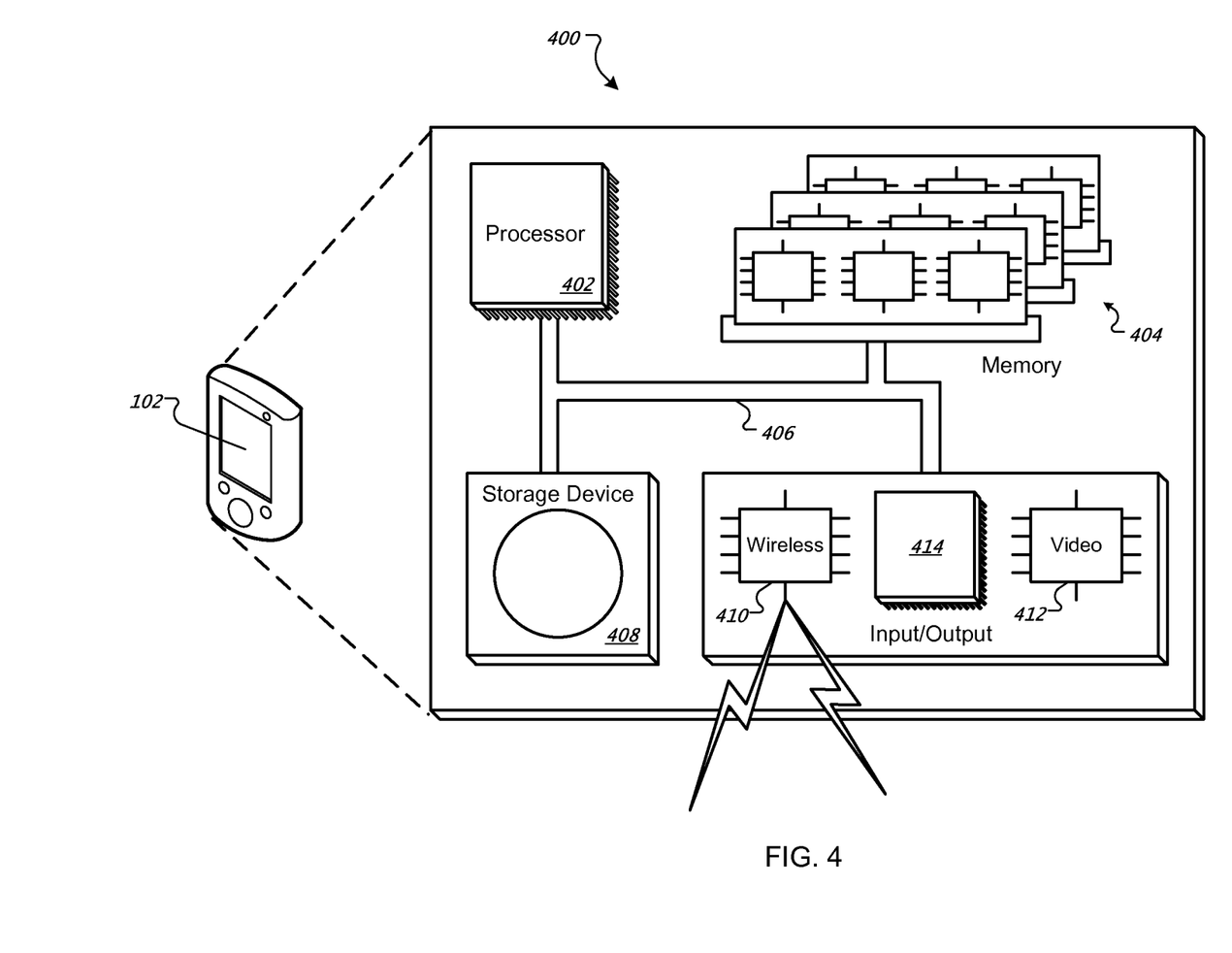
FIG. 4 is a schematic diagram of a generic mobile device.

FIG. 4 is a schematic diagram of a generic mobile device 400. Examples of representative mobile devices include the Samsung D900 available from Samsung, the Palm Treo from Palm, Inc., the Blackberry available from Research in Motion Corporation, and the Pocket PC which is available from various vendors. The mobile device 400 can be used for practicing operations described in association with the method 200 and the system 300. The mobile device 400 minimally includes one or more processors 402, a memory 404, a storage device 408 and input/output devices that include a processor 414 for processing user input from keypads 312 and other devices, a wireless communication processor 410 and logic 412 for driving a display 102. Each of the components 402, 404, 408, 410 412 and 414 are interconnected using a system bus 406. The processor 402 is capable of processing instructions for execution within the system device 400. Such executed instructions can implement one or more steps of method 200 or one or more components of system 300, for example. The processor 402 is a single or multi-threaded processor having one or more processor cores, for instance.

The processor 402 is capable of processing instructions stored in the memory 404 or on the storage device 408 to display graphical information for a user interface on the display 102. The memory 404 is a computer readable medium such as volatile or non volatile random access memory that stores information within the system device 400. The memory 404 could store data structures representing content, for example. The storage device 408 is capable of providing persistent storage for the device 400. The storage device 408 may be a hard disk device, an optical disk device, a flash memory, or other suitable persistent storage means.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A computer-implemented method for providing a graphical user interface (GUI), the method comprising:
   receiving a first input indicating a first cursor navigation direction in a first visual area of the GUI, the first visual area presenting a plurality of topic indicators displayed concurrently in a sequence on a screen, wherein the plurality of topic indicators are destinations for cursor navigation in the first visual area;
   in response to the first input, selecting a first topic indicator from the plurality of topic indicators based on the first cursor navigation direction;
   presenting a second visual area within the first visual area of the GUI, the second visual area hiding the first topic indicator while others of the plurality of topic indicators are visible, the second visual area having first content items associated with the first topic indicator that are destinations for cursor navigation in the second visual area, wherein a current content item of the first content items has focus;
   receiving a second input indicating a second cursor navigation direction in the second visual area other than the first cursor navigation direction; and
   in response to the second input, moving the focus from the current content item to a next content item of the first content items, where the cursor navigation in the first direction and the cursor navigation in the second direction are concurrently available on the screen.

2. The method of claim 1, further comprising:
   enlarging the next content item while the next content item has the focus.

3. The method of claim 2, further comprising:
   creating space for the enlarged next content item in the second visual area by partially clipping another of the first content items or by moving others of the first content items apart.

4. The method of claim 1, wherein the first content items in the second visual area have a configuration selected from:
   a vertical list;
   a rectangular grid; and
   a multidimensional configuration.

5. The method of claim 1, further comprising:
   receiving a third input indicating user selection of the next content item in the second visual area; and
   in response to the third input, launching an application for the next content item.

6. The method of claim 1, wherein the second visual area has a wraparound configuration, wherein when scrolling among the first content items reaches a last one of the first content items, the scrolling continues with a first one of the first content items.

7. The method of claim 1, further comprising:
   based on the plurality of topic indicators being too many to be simultaneously visible in the GUI, presenting a hint at an edge of the first visual area adjacent at least one currently non-visible one of the plurality of topic indicators.

8. The method of claim 1, wherein at least one of the first and second inputs comprises touch navigation generated using a touchscreen.

9. A computer program product, encoded on a non-transitory computer-readable medium, operable to cause data processing apparatus to perform operations comprising:
receiving a first input indicating a first cursor navigation direction in a first visual area of the GUI, the first visual area presenting a plurality of topic indicators displayed concurrently in a sequence on a screen, wherein the plurality of topic indicators are destinations for cursor navigation in the first visual area;
in response to the first input, selecting a first topic indicator from the plurality of topic indicators based on the first cursor navigation direction;
presenting a second visual area within the first visual area of the GUI, the second visual area hiding the first topic indicator while others of the plurality of topic indicators are visible, the second visual area having first content items associated with the first topic indicator that are destinations for cursor navigation in the second visual area, wherein a current content item of the first content items has focus;
receiving a second input indicating a second cursor navigation direction in the second visual area other than the first cursor navigation direction; and
in response to the second input, moving the focus from the current content item to a next content item of the first content items, where the cursor navigation in the first direction and the cursor navigation in the second direction are concurrently available on the screen.

10. The computer program product of claim 9, wherein the first content items in the second visual area have a configuration selected from:
a vertical list;
a rectangular grid; and
a multidimensional configuration.

11. The computer program product of claim 9, wherein the operations further comprise:
receiving a third input indicating user selection of the next content item in the second visual area; and
in response to the third input, launching an application for the next content item.

12. The computer program product of claim 9, wherein at least one of the first and second inputs comprises touch navigation generated using a touchscreen.

13. A system comprising:
a display device; and
a device operable to interact with the display device and to perform operations comprising:
receiving a first input indicating a first cursor navigation direction in a first visual area of the GUI, the first visual area presenting a plurality of topic indicators displayed concurrently in a sequence on a screen, wherein the plurality of topic indicators are destinations for cursor navigation in the first visual area;
in response to the first input, selecting a first topic indicator from the plurality of topic indicators based on the first cursor navigation direction;
presenting a second visual area within the first visual area of the GUI, the second visual area hiding the first topic indicator while others of the plurality of topic indicators are visible, the second visual area having first content items associated with the first topic indicator that are destinations for cursor navigation in the second visual area, wherein a current content item of the first content items has focus;
receiving a second input indicating a second cursor navigation direction in the second visual area other than the first cursor navigation direction; and
in response to the second input, moving the focus from the current content item to a next content item of the first content items, where the cursor navigation in the first direction and the cursor navigation in the second direction are concurrently available on the screen.

14. The system of claim 13, wherein the first content items in the second visual area have a configuration selected from:
a vertical list;
a rectangular grid; and
a multidimensional configuration.

15. The system of claim 13, wherein the operations further comprise:
receiving a third input indicating user selection of the next content item in the second visual area; and
in response to the third input, launching an application for the next content item.

16. The system of claim 13, wherein the display device comprises a touchscreen, and at least one of the first and second inputs comprises touch navigation generated using the touchscreen.

17. The method of claim 1, further comprising:
receiving a third input indicating the first cursor navigation direction in the first visual area of the GUI;
in response to the third input, selecting the second topic indicator from the plurality of topic indicators; and
presenting a third visual area within the first visual area of the GUI, the third visual area hiding the second topic indicator, and removing the second visual area in the GUI to reveal the first topic indicator while others of the plurality of topic indicators are visible, the third visual area having the second content items associated with the second topic indicator that are destinations for cursor navigation in the third visual area, wherein a current content item of the second content items has focus.

\* \* \* \* \*